United States Patent [19]

Losada

[11] Patent Number: 4,736,923
[45] Date of Patent: Apr. 12, 1988

[54] FASTENER ASSEMBLY

[76] Inventor: Alfonso Losada, 30 Stagg St., Stratford, Conn. 06490

[21] Appl. No.: 912,838

[22] Filed: Sep. 29, 1986

Related U.S. Application Data

[63] Continuation-in-part of Ser. No. 797,046, Nov. 12, 1985, Pat. No. 4,703,883.

[51] Int. Cl.$^4$ ............................................. F16M 13/00
[52] U.S. Cl. .................................. 248/547; 248/216.1
[58] Field of Search ................................ 227/9, 10, 11; 248/216.1, 547, 300; 411/439, 440, 441

[56]  References Cited

U.S. PATENT DOCUMENTS 3,638,892  2/1972  Boye et al. ............................ 227/9 X

FOREIGN PATENT DOCUMENTS 484427  8/1976  Australia ............................ 411/441
518452  3/1953  Belgium ............................ 227/10

Primary Examiner—J. Franklin Foss
Attorney, Agent, or Firm—Arthur T. Fattibene

[57] ABSTRACT

A fastener assembly of the type which is forceably driven in to a support structure, e.g. by a power actuated fastener gun. The fastener assembly is defined as a bracket plate having a surface or edge portion by which it is disposed in bearing relationship to a supporting surface, and which plate is formed with a depression or deformed portion which is disposed out of the plane of the bearing portion. An aperture is formed to extend through the depressed portion formed out of the plane of the bracket plate and a stud having a pointed end is frictionally retained in said aperture, the stud being retained so that the pointed end does not extend beyond the bearing surfaces or edges of the bracket plate. The bracket plate includes a depending or angularly offset leg portion. In one form of the invention, the leg portion is angularly offset at an accute angle relative to the surface bearing or edge portion.

9 Claims, 2 Drawing Sheets

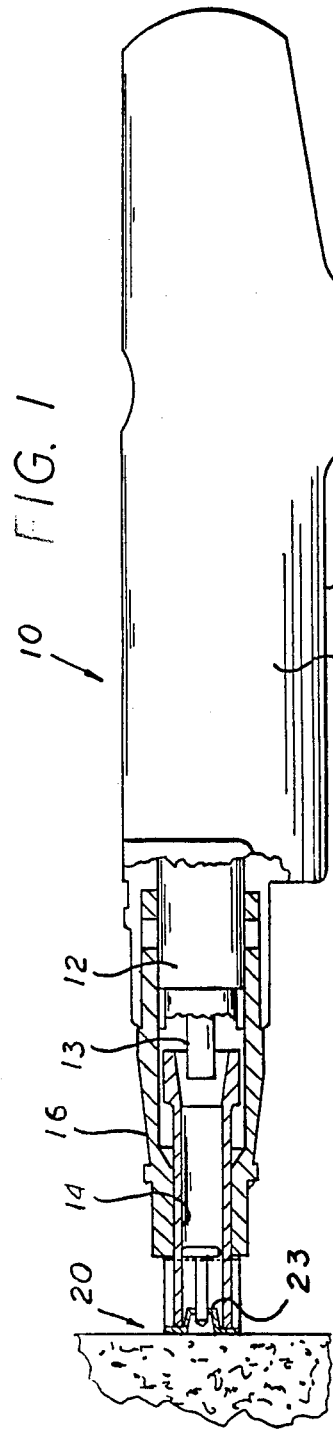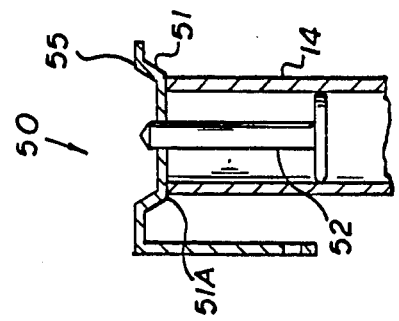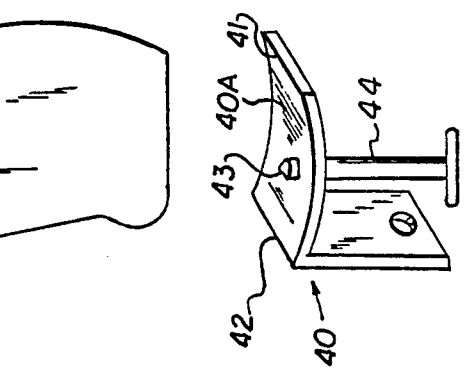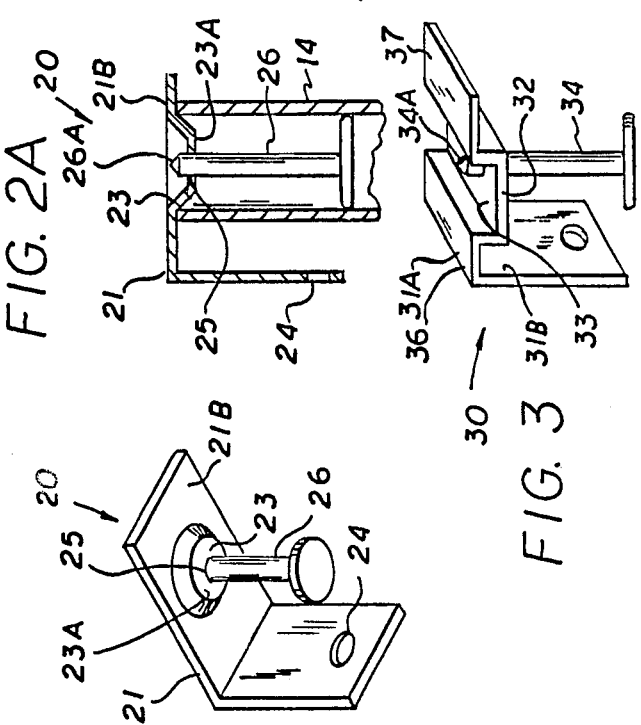

FASTENER ASSEMBLY

This application is a continuation in part application of my co-pending application Ser. No. 797,046 filed Nov. 12, 1985, now U.S. Pat. No. 4,703,883, for Improved Fastener Assembly.

FIELD OF INVENTION

This invention is directed to an improved fastener assembly of the type which are intended to forceably be driven into a support wall or structure by a power actuated gun.

RELATED APPLICATION

This invention relates to improvements in fasteners of the type disclosed in a co-pending application, Ser. No. 785,274 filed Oct. 7, 1985, now U.S. Pat. No. 4,684,050, for a Powder Actuate Fastening System and Fastener Assembly for Use Therewith.

BACKGROUND OF THE INVENTION

In the construction trades and building industries, there is a need to apply numerous fasteners to a support structure or wall for various reasons, e.g. for supporting sub-structures such as holders or clamps for pipes, conduits ceilings and for various other purposes. Frequently, such support walls are formed of stone, brick, masonry and the like, thereby making the driving of a stud or fastener exceedingly difficult.

To expedite the securing of such fasteners into concrete or masonry types of wall structures, there have been developed various power actuated guns to forceably drive or shoot such fasteners into a masonry wall. A a safety feature, such guns are constructed so that it is essential that the muzzle end of the gun be forceably pressed against the surface of the wall to effect a slight retraction thereof before the trigger can be actuated to set off the powder charge.

The fasteners heretofore known to be used with such guns included a bracket and an associated stud having a pointed end extending beyond the fastener. The arrangement was such that when such prior known fasteners were applied to the gun, the pointed end of the fastener generally defined the bearing point against which the pressure was applied to place the gun in firing condition. Because the point of the stud defined the bearing point, it frequently happened that the gun, due to its weight, fatigue or other reasons would be angled off the perpendicular causing the gun to misfire or not fire. As a result, there frequently resulted a dangerous condition if the gun was not disposed perpendicular to the support structure during a fastener firing operation.

Also many such brackets comprised righ angle brackets having leg portions disposed at substantially right angles, wherein one leg portion is disposed in bearing relationship to a supporting structure and the other leg portion being disposed normal to the supporting structure. The amount of material to form such angle brackets had to be sufficient so as to enable the distance between the axis of the stand and the normal leg portion to be a predetermined distance sufficient to provide for gun clearance.

The disclosure of the foregoing mentioned patent application discloses means for obviating the problem herein mentioned. This invention discloses a further solution to the problem.

Objects

An object of this invention is to provide an improved fastener assembly of the type that is forceably driven into a support structure which is constructed so as to insure that the gun is disposed perpendicular to the wall so as to ensure proper actuation of the gun.

Another object is to provide an improved fastener construction that is positive in operation and which can be readily fabricated with a minimum of parts.

Another object is to provide a fastener assembly of the type that is forceably driven into a support structure which is rendered self-aligning to the muzzle of a fastener gun.

Another object is to provide a fastener assembly of the type that is forceably driven into a support structure having a planar bearing surface arranged to be perpendicularly disposed to a supporting wall.

Another object is to provide a fastener assembly construction from a minimum of material and still maintain the same relative lateral spacing between the axis of the firing gun and the edge or opening in the normal leg portion.

Another object is to provide a fastener construction that will resist rotation when secured to a supporting surface or structure.

Another object is to provide a fastener construction having an arrangement whereby the securing stud is frictionally retained to the fastener at the parallel side portion of the stud shank.

Another object is to provide a fastener construction having angularly disposed leg portion arranged to deflect when secured to a support struction so as to reduce the turning moment when a load is applied thereto.

SUMMARY OF THE INVENTION

The foregoing objects and other features and advantages of this invention are attained by a fastener assembly which includes a bracket plate, e.g. an angle member, washer, or other suitably shaped member having a planar portion formed with a depression or recess which is disposed out of the plane of the planar portion, and which depression or recess is provided with an aperture extending therethrough. A stud having a point on one end and a headed portion at its opposite end is provided with a diameter which is sized to be frictionally secured in the aperture. The arrangement is such that the stud is disposed normal to the planar portion whereby the pointed end of the stud is disposed within the recessed or depressed portion.

One form of the invention includes an angle member whereby the leg portions are disposed at substantially right angles. In another form the angularly disposed leg portions are disposed at an acute angle relative to each other; and one of the leg portions being provided with a recessed or protruding portion having an aperture therein for frictionally securing its fastening stud thereto. The arrangement of the latter construction is such that the fastener will resist rotation when secured to a supporting surface. Also the latter construction may be formed of a thinner gage plate which causes the angular disposed leg portion to flex when secured to a support structure. The arrangement is such that the flexing of the free leg portion reduces the lever arm between the arm and the load adapted to be supported by the angled member.

FEATURES

A feature of this invention resides in a fastener assembly which includes a bracket member having a planar portion with an aperture disposed in a recessed portion so that the planar portion maintains the bracket normal to a support struction.

Another feature resides in a gun fired fastener which includes a stud secured thereto, whereby the pointed end of the stud is recessed relative to the planar or bearing portion of the fastener.

Another feature resides in a gun fired fastener assembly which includes a bracket member which is recessed or depressed wherein the recessed portion in co-operation with the head of the studs aligns the fastener assembly in the muzzle of the powder actuated gun.

A feature of this invention resides in a fastener assembly that includes a angled bracket having leg portions disposed at an acute angle.

Another feature resides in the provision of an angle bracket which when secured to a supporting surface will resist rotation.

Another feature resies in an angled bracket construction which will be rendered self flexing so as to reduce the lever arm between the supporting stud and the applied load.

Other features and advantages will become more readily apparent when considered in view of the drawings in which:

FIG. 1 is a side view of a powder actuated fastener gun having a portion shown in section to illustrate the application of the improved fastener assembly.

FIG. 2 is a perspective view of the fastener assembly shown in FIG. 1.

FIG. 2A is a sectional view taken along lines 2A—2A on FIG. 2 with the fastener assembly fitted to the muzzle end of the gun.

FIG. 3 is a perspective view of another modified fastener assembly.

FIG. 4 is a perspective view of still another modified fastener assembly.

FIG. 5 is a perspective view of still another modified fastener assembly.

DETAILED DESCRIPTION

Figure 6:
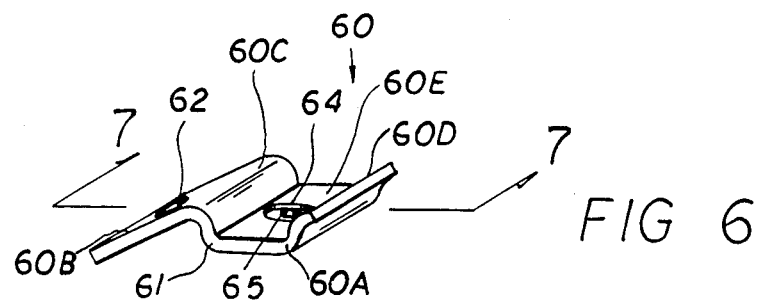
FIG. 6 is a perspective view of a modified fastener assembly embodying the invention.

Referring to the drawings, there is shown in FIG. 1 a powder actuated fastener gun 10 of general construction. Such powder actuated guns are well known in the art. One such gun is manufactured by Hilti Fastening Systems of Tulsa, Okla. Other makers make a similar tool. Such guns generally include a gun body 11 having a piston guide 12 in which a firing piston 13 is slidably mounted. Disposed in line with the piston guide 12 is the fastener guide 14 which defines the muzzle of the gun and which receives the stud of the fastener assembly as will be herein described. The fastener guide 14 is maintained relative to the firing piston 13 by a base plate or nose sleeve 16 which is slidably mounted relative to the piston guide 12. The gun 10 is constructed so that the muzzle end of the gun 10, with a fastener in place therein, must be pressed perpendicularly to the support structure S so that the fastener guide must be slightly retracted before the gun can fire. Normally, the prior known fasteners had a stud projecting beyond the bracket which define a point contact with the support surface, which frequently causes the gun to be angled relative to the support wall S rather than being held perpendicular thereto; and thereby causing the gun to misfire and/or to cause undesired angulation of the stud which could result in serious accidents.

In accordance with this invention, an improved fastener assembly 20 is provided for obviating the noted difficulties. As shown in FIG. 2, the fastener assembly 20 comprises a bracket or plate member 21, which is illustrated as an angled member having angularly disposed leg portions 21A and 21B. At least one leg portion, e.g. 21B, is provided with a recessed or depressed portion 23 which is disposed out of the plane of the leg portion 21B. The other leg portion 21A may be provided with an apperture 24 which may have suspended or secured therefrom a cable or wire for supporting framework of a suspended ceiling, conduits, pipes, etc.

In the illustrated embodiment of FIG. 2, the recessed portion is shown to be circular in shape and is sized so as to be snuggly received in the end of the nozzle or fastener guide 14 of the gun 20. The bottom 23A of the recessed or depressed portion is provided with a hole or apperture 25 which extends therethrough. A stud 26 having its pointed end 26A is provided with a diameter which is sized so as to be frictionally retained to the hold or apperture 25, as best seen in 2A. The arrangement is such that the stud 26 is securely retained by a tight friction fit to the leg portion 21B so that the pointed end 26A of the stud 26 does not extend beyond the planar surface of the leg portion 21B. The stud 26 is provided at its other end with a headed portion 26B. As best been in FIGS. 1 and 2A, the headed portion 26B is formed with a diameter slightly less than the internal diameter of the fastener guide 14. Thus, as seen in FIG. 2A, the recessed or depressed portion 23, together with the headed end 26B of the stud, cooperate to define spaced apart bearing surfaces for maintaining the stud and assocated bracket plate 21 normal or perpendicular to the axis of the gun muzzle. Also, as shown in FIGS. 1, 2, and 2A, the leg portion circumscribing the depressed or recessed piston forms a planar surface, which in the operative position bears normal to support wall S as best seen in FIG. 1, with the pointed end 26A of the stud interposed between the bottom 23A of the recess and the support wall S in the operative position. Thus, as seen in FIG. 1, the fastener bracket 21 and associated stud 26 are disposed normal to the wall to insure proper firing of the gun. The planar surface of the fastener thus insures that the gun with a fastener, as described loaded thereto, will permit the user to automatically insure that the gun is disposed normal to the wall S.

It will be understood that the fastener member 21 may ssume other shapes than as angle member. The fastener member may be a washer, a pipe clamp, and other shaped member.

FIG. 3 illustrates a modified fastener assembly. As shown, the fastener assembly 30 is also illustrated as an angle member 31 having opposed leg portions 31A and 31B. In this form of the invention, one leg member, e.g. portion 31A, is provided with a U-shaped channel formed therein, where the bottom 32 of the U-shaped channel is provided with an apperture 33 for frictionally receiving a stud 34 as herein described. As shown, the stud 34 is tightly retained to the apperture 33 as herein described. As shown, the stud 34 is tightly retained to the aperture 33 as herein described so that the pointed end 34A is disposed within the U-shaped channel portion. In this construction, the portions or surfaces 36 and 37 extending laterally to either side of the channel define planar bearing surface to engage the supporting wall S when the fastener 30 is fitted to the gun 10 for placement.

FIG. 4 illustrates a further embodiment. In this form, the bracket 40, shown as an angle member provided with one leg portion 40A which is arcuate or bowed to define a pair of opposed bearing edges 41 and 42. Centrally disposed in the arcuate portion is an apperture 43 to which a stud 44, as herein described, is frictionally secured. As shown, the pointed end of the stud 44 is below a plan which contain the opposed bearing edges 41, 42. It will be apparent that when the fastener assembly 40 is fitted to the muzzle of the gun 10 for placement, that the opposed edges 41 and 42 will bear against the wall S to perpendicularly align the gun to the wall.

FIG. 5 illustrates another modified embodiment. In this form, the fastener assembly 50 is similar to the embodiment of FIG. 2, which the exception that the recessed portion 51 may be provided with an overall diameter greater than the internal diameter of the fastener guide 14 of the gun. With an enlarged recess diameter as shown in FIG. 5, the end of the muzzle or fastener guide 14 will bear on the bottom wall portion 51A of the recessed portion. In this embodiment, the stud 52 is frictionally retained in an appropriate sized hole formed in the bottom of the recessed portion, with the pointed end of the stud disposed to one side of the planar portion 55 of the angled bracket 50.

In each embodiment described, the stud is frictionally secured with the pointed end disposed to the outer side of the bearing surface or edge of the respective fasteners when placed against a supporting surface. With the fasteners described, two components are required, i.e., the plate member and the stud. Also, the bracket plate may take any desired bracket configuration so long as a portion or planar surface thereof is provided with a recess, depression or the like, which is greater than the length of the exposed stud tip.

Figure 7:
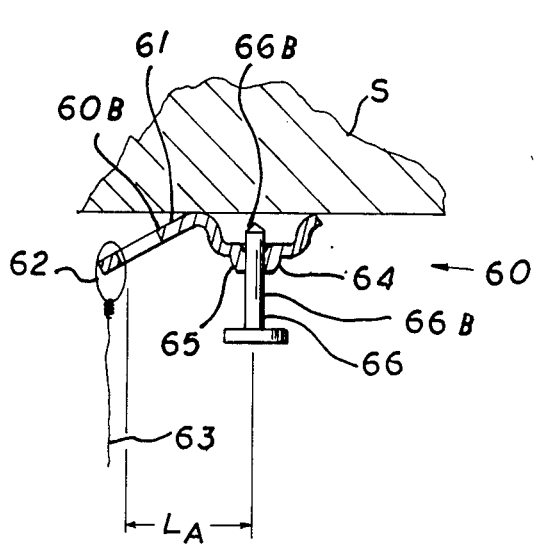
FIG. 7 is a sectional view taken on line 7—7 on FIG. 6.

FIGS. 6 and 7 illustrate another bracket assembly 60 embodying the invention. As shown, the assembly 60 comprises a bracket 61 having angularly disposed leg portions 60A, 60B. Leg portion 60A is defined by a U-shaped or channel shaped configuration having opposed angularly disposed edges 60C and 60D which are disposed at substantially right angles to the interconnecting web portion 60E. Connected to the free end of edge 60C is the angularly disposed leg portion 60B. Leg portion 60B is angled at an acute angle relative to leg portion 60A as shown. The leg portion 60B is provided with an aperture 62 for receiving or supportion a wire or hanger 63 for supporting a load, e.g. a ceiling panel or other load.

As seen in FIG. 7, the web portion is provided with a recessed or protruding portion 64 which is formed with a stud hole 65. The arrangement is such and the hole 65 is sized so as to frictionally secure the securing stud 66 thereto. Studs utilized with such brackets has a shank portion 66B having generally parallel side portion and a connected tip end 66B that tapers to a point. In accordance with this invention, the stud 66 is frictionally retained so that the tip end of the stud is disposed within the channel shape of leg portion 60A so that when the bracket 61 is presented to a support structure, the ends of the edges 60C and 60D define the bearing surface; and not the tip of the stud 66. The recessed or protuding portion 64 thus permits the stud hole 65 to be located so that the circumference of the hole can frictional engage the parallel shank portion to ensure a good frictional connection with the stud 66.

Figure 7A:
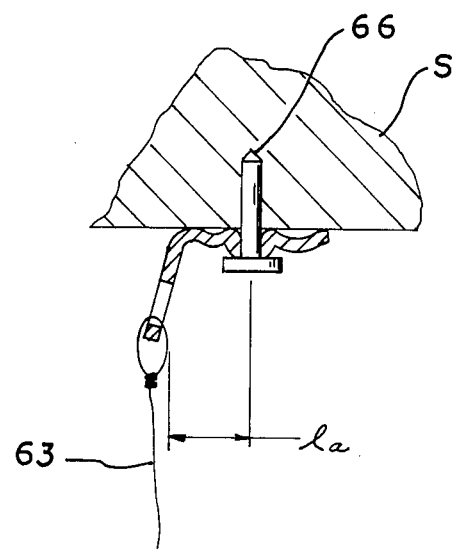
FIG. 7A is a section view similar to that of FIG. 7 shown on the parts in the secured position.

As seen in FIG. 6, it will be noted that the length of the channel leg portion 60A is disposed normal to the longitudinal axis of the angled leg portion 60B. The configuration described enables the free leg portion 60B to flex downwardly as seen in FIG. 7A when the fastener is secured to a support structure S. This is because the force driving the stud 66 in a wall or support S causes the web portion 60E of leg portion 60A to deflect or concave inwardly toward the wall or support S, and which defection causes the free end of leg portion to flex inwardly toward the axis of the stud 66. Thus the LA as shown in FIG. 7 is reduced to la as shown in FIG. 7A; the lever arm being the distance between the axis of the stud and the axis of the hanger or wire support 63. By reducing the lever arm from LA to la reduces the turning movement which the load places on the secured bracket assembly; since the turning movement M is equal to the load times the lever arm LA or la. The bracket construction of FIG. 7 also provides additional clearance for the power gun nozzle since the distance between the axis of the stud 66 and the hole 63 is maximized by the accute angle of the leg portion 60B.

With the construction described it will be noted that in the fastened position as shown in FIG. 7A, the secured leg portion 60A is deflected so that the opposed edges 60C and 60D and intermediate portions are disposed in bearing relationship to the wall or support structure S. Such three bearing edges resists any tendency for the bracket 61 to rotate about the axis of the stud 66.

Figure 8:
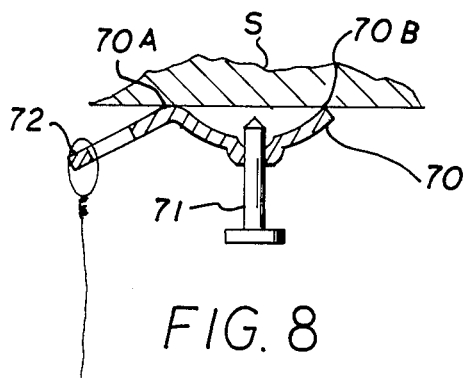
FIG. 8 is a sectional view of another modified embodiment.
Figure 9:
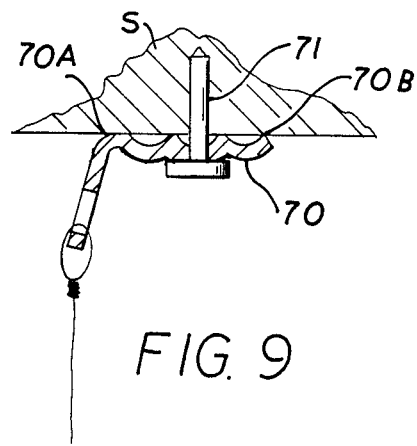
FIG. 9 is a view similar to that of FIG. 8, but showing the assembly secured to a support structure.
Figure 8A:
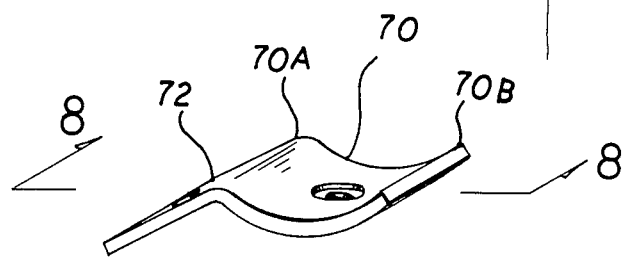

FIGS. 8 and 9 illustrate a further modified form of the invention. This form of the invention is similar to that described with respect to FIGS. 6, 7 and 7A, with the exception that the leg portion 70 to which the stud 71 is frictionally secured is curvilinear in cross section as shown. Thus the free edges 70A, 70B are disposed in bearing relationship to a support wall or structure S with the point of the stud within the bearing plane of edges 70A and 70B. The cirvilinear shape of leg portion 70 extends normal to the angular disposed leg portion 72.

As described with respect to FIGS. 7 and 7A, when the stud 71 is powered into the wall or support S, the force imparted to the stud causes the curvilinear portion to deflect at an intermediate point as shown in FIG. 9. In doing so the free end of leg portion 72 is displaced in the direction of the stud, as hereinbefore described.

Thus the advantages attributed to the flexing of leg portion 70 when the stud is powered into the wall or support S are similar to that described as noted with the construction of FIGS. 6, 7 and 7A.

While the foregoing has been described with respect to several embodiments thereof, it will be appreciated and understood that variations and modifications may be made without departing from the spirit or scope of the invention.

What is claimed is:

1. An improved fastener assembly of the type which is forceably driven into a support structure by a power actuated gun comprising
   a bracket plate having angularly disposed leg portions,
   one of said leg portions being generally channel shaped in cross-section which extends in a direction normal to the other leg portion,
   said channel shaped leg portion having an aperture formed therein,
   a stud frictionally secured in said aperture so that the tip of the stud does not extend beyond the channel shape cross-section,
   and said other leg portion being disposed at an obtuse angle relative to said channel shaped portion in the normal position and whereby said other leg portion is deflected toward a normal position when said fastener assembly is secured to a supporting surface.

2. A fastener assembly as defined in claim 1 and including means defining a depression about said aperture whereby said aperture is disposed on the plane of said channel shaped cross-section.

3. A fastener assembly as defined in claim 1 wherein the material of said bracket plate deforms under the force exerted to impale the stud into a supporting surface whereby the plane of said channel cross sectional shape is deformed toward the supporting surface and causing said other leg to flex toward a normal position relative to said channel shaped cross-section.

4. A fastener assembly as defined in claim 1 where said channel shaped member is generally rectilinear.

5. A fastener assembly as defined in claim 1, wherein said channel shaped member is curvilinear.

6. A fastener assembly as defined in claim 1 wherein said other leg portion is provided with a hole adjacent the outer end thereof.

7. A fastener assembly of the type which is adapted to be forceably driven into a support structure by a power activated gun comprising
   a bracket having a first leg portion and a second leg portion angularly disposed relative to said first leg portion,
   said first leg portion having opposed edges having interconnected therebetween an interconnecting web portion,
   said opposed edges projecting out of the plane of said web portion and projecting to the same side of said web portion where said first leg portion is channel shaped in cross-section,
   said second leg portion being integrally connected to the end of one of said edges and said second leg portion extending laterally of said one edge and angularly relative thereto,
   means defining a depression formed in said web portion,
   an aperture formed in said depression,
   a stud having a shank portion terminating in a pointed tip portion,
   said shank portion having a diameter sized so that said stud is frictionally retained in said aperture so that the pointed tip portion does not extend beyond the opposed edges of said first leg portion,
   and said bracket being formed of a material that will deform under the force exerted for impaling the stud into a supporting surface causing said second leg portion to flex toward a normal position relative to said first leg portion.

8. A bracket assembly as defined in claim 7 wherein said second leg portion is angularly disposed relative to said second leg portion more than 90° and less than 180° in its normal unfastened condition.

9. A bracket assembly as defined in claim 7 wherein axis of said channel shaped first leg portion extends normal to axis of said second leg portion.

* * * * *